United States Patent
Tetsuka

(10) Patent No.: US 10,475,303 B2
(45) Date of Patent: Nov. 12, 2019

(54) BICYCLE ELECTRIC DEVICE

(71) Applicant: Shimano Inc., Sakai, Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/460,940

(22) Filed: Mar. 16, 2017

(65) Prior Publication Data

US 2018/0268668 A1 Sep. 20, 2018

(51) Int. Cl.

| | |
|---|---|
| *B62J 3/00* | (2006.01) |
| *G08B 7/06* | (2006.01) |
| *B62J 11/00* | (2006.01) |
| *B62M 3/08* | (2006.01) |
| *B62M 3/16* | (2006.01) |
| *G01C 9/06* | (2006.01) |
| *G01D 5/14* | (2006.01) |
| *H04W 4/80* | (2018.01) |
| *B62M 6/00* | (2010.01) |

(52) U.S. Cl.
CPC ............ *G08B 7/06* (2013.01); *B62J 11/00* (2013.01); *B62M 3/08* (2013.01); *B62M 3/16* (2013.01); *G01C 9/06* (2013.01); *G01D 5/14* (2013.01); *B62M 6/00* (2013.01); *G01C 2009/066* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 5,027,303 | A | * | 6/1991 | Witte .................. A61B 5/222 |
| | | | | 482/8 |
| 9,010,201 | B2 | | 4/2015 | Kodama et al. |
| 9,581,508 | B2 | | 2/2017 | Tetsuka et al. |
| 2009/0120210 | A1 | | 5/2009 | Phillips et al. |
| 2010/0024590 | A1 | * | 2/2010 | O'Neill ................ G01L 3/242 |
| | | | | 74/594.1 |

(Continued)

FOREIGN PATENT DOCUMENTS

| | | |
|---|---|---|
| CN | 102730145 A | 10/2012 |
| CN | 105460122 A | 4/2016 |

(Continued)

OTHER PUBLICATIONS

Rodrigo R. Bani et al., Measuring Pedal Forces, Biomechanics of Cycling Chapter 2, Book (ISBN: 978-3-319-05538-1), 2014, pp. 13-21, Springer, Germany.

*Primary Examiner* — Adolf Dsouza
(74) *Attorney, Agent, or Firm* — Global IP Counselors, LLP

(57) ABSTRACT

A bicycle electric device is basically provided to a bicycle crank assembly. The bicycle electric device includes an indicator a process and at least one of a position sensor and a strain sensor configured to be provided on the bicycle crank assembly. The indicator is configured to generate a user signal indicating that a crank arm of the bicycle crank assembly is at a predetermined angular position. The position sensor the strain sensor are configured to be provided on the bicycle crank assembly to detect information of the crank arm. The processor is configured to process information detected by the at least one of the position sensor and the strain sensor to calculate angular force information of the crank arm.

23 Claims, 10 Drawing Sheets

(56) References Cited

U.S. PATENT DOCUMENTS

2013/0210583 A1    8/2013   Kametani et al.
2014/0060212 A1    3/2014   Tetsuka et al.
2014/0200835 A1    7/2014   Carrasco Vergara

FOREIGN PATENT DOCUMENTS

WO    2012/056510 A1    5/2012
WO    2012/056522 A1    5/2012

\* cited by examiner

BICYCLE ELECTRIC DEVICE

BACKGROUND

Field of the Invention

This invention generally relates to a bicycle electric device. More specifically, the present invention relates to a bicycle electric device that aids in determining an angle of a crank arm.

Background Information

Bicycles are sometimes equipped with various sensors for providing information to a rider and/or for providing information to a controller to control various aspects of the bicycle, such as shifting or suspension stiffness. For example, pedaling force detectors typically use strain gauges to measure pedaling force during pedaling. These pedaling force detectors are sometimes disposed on a bicycle crank assembly such as disclosed in U.S. Pat. No. 9,581,508 (assigned to Shimano). Sensor circuits may be configured to process the pedaling force information detected by the strain gauges and transmit this information so that it is received by the rider.

SUMMARY

Generally, the present disclosure is directed to various features of a bicycle electric device. In one feature, a bicycle electric device is provided with an indicator that is configured to generate a user indication signal for aiding the determination of an angle of a crank arm.

In view of the state of the known technology and in accordance with a first aspect of the present disclosure, a bicycle electric device is basically provided to a bicycle crank assembly. The bicycle electric device comprises an indicator configured to generate a user signal indicating that a crank arm of the bicycle crank assembly is at a predetermined angular position.

Advantageously according to the first aspect of the present invention, the bicycle electric device can be used to easily position the crank arm of the bicycle crank assembly to the predetermined angular position so that a crank angle of the crank arm can be measured.

In accordance with a second aspect of the present invention, the bicycle electric device according to the first aspect is configured so that the bicycle electric device further comprises a position sensor. The position sensor is configured to be provided on the bicycle crank assembly to detect the predetermined angular position of the crank arm with respect to a bicycle frame.

Advantageously according to the second aspect of the present invention, by providing the position sensor, the predetermined angular position of the crank arm can be detected during pedaling.

In accordance with a third aspect of the present invention, the bicycle electric device according to the second aspect is configured so that the position sensor is configured to be provided on the crank arm.

Advantageously according to the third aspect of the present invention, by providing the position sensor on the crank arm, an existing crank arm can be retrofitted with the position sensor, or a new crank arm can be easily manufactured with the position sensor.

In accordance with a fourth aspect of the present invention, the bicycle electric device according to the second or third aspects is configured so that the bicycle electric device further comprises a wireless communication device operatively coupled to the crank arm.

Advantageously according to the fourth aspect of the present invention, the bicycle electric device can be easy to install on a bicycle without needing to route wires.

In accordance with a fifth aspect of the present invention, the bicycle electric device according to any one of the second to fourth aspects is configured so that the position sensor includes a reed switch.

Advantageously according to the fifth aspect of the present invention, the bicycle electric device can be inexpensively manufactured using a relatively inexpensive reed switch.

In accordance with a sixth aspect of the present invention, the bicycle electric device according to any one of the second to fifth aspects is configured so that the bicycle electric device further comprises a magnet configured to be mounted on the bicycle frame.

Advantageously according to the sixth aspect of the present invention, the bicycle electric device can be inexpensively manufactured using a relatively inexpensive magnet.

In accordance with a seventh aspect of the present invention, the bicycle electric device according to any one of the second to sixth aspects is configured so that the indicator is a light source.

Advantageously according to the seventh aspect of the present invention, the predetermined angular position of the crank arm can be visually detected.

In accordance with an eighth aspect of the present invention, the bicycle electric device according to any one of the second to seventh aspects is configured so that the indicator is a sound source.

Advantageously according to the eighth aspect of the present invention, the predetermined angular position of the crank arm can be audibly detected.

In accordance with a ninth aspect of the present invention, the bicycle electric device according to any one of the second to eighth aspects is configured so that the bicycle electric device further comprises a mobile device. The mobile device includes a processor for calculating a crank angle based on the predetermined angular position detected by the position sensor.

Advantageously according to the ninth aspect of the present invention, the bicycle electric device can be used with a bicycle crank assembly that does not have a device for detecting the crank angle with respect to a horizontal or vertical plane.

In accordance with a tenth aspect of the present invention, the bicycle electric device according to the ninth aspect is configured so that the mobile device has an inclinometer.

Advantageously according to the tenth aspect of the present invention, the mobile device can be a conventional device that includes an inclinometer.

In accordance with an eleventh aspect of the present invention, the bicycle electric device according to the tenth aspect is configured so that the inclinometer includes at least one of an accelerometer and a gyroscope.

Advantageously according to the eleventh aspect of the present invention, the inclinometer can be relatively inexpensive.

In accordance with a twelfth aspect of the present invention, the bicycle electric device according to any one of the second to eleventh aspects is configured so that the bicycle electric device further comprises a storage device operatively coupled to the crank arm.

Advantageously according to the twelfth aspect of the present invention, the bicycle electric device can store various data including the crank angle corresponding to the predetermined angular position of the crank arm that is detected by the position sensor.

In accordance with a thirteenth aspect of the present invention, the bicycle electric device according to any one of the second to twelfth aspects is configured so that the bicycle electric device further comprises at least one strain sensor. The at least one strain sensor is disposed on the crank arm and configured to detect a pedaling force applied to the crank arm.

Advantageously according to the thirteenth aspect of the present invention, the bicycle electric device can easily detect a pedaling force applied to the crank arm.

In accordance with a fourteenth aspect of the present invention, the bicycle electric device according to the thirteenth aspect is configured so that the bicycle electric device further comprises a processor. The processor is configured to process the pedaling force detected by the at least one strain sensor to calculate angular force information.

Advantageously according to the fourteenth aspect of the present invention, the bicycle electric device can calculate angular force information for the rider.

In accordance with a fifteenth aspect of the present invention, the bicycle electric device according to the fourteenth aspect is configured so that that the bicycle electric device further comprises a cycle computer. The cycle computer has a display that is configured to receive the angular force information calculated by the processor, and that is configured to display the angular force information on the display.

Advantageously according to the fifteenth aspect of the present invention, the bicycle electric device can display angular force information at a convenient location for the rider.

In accordance with a sixteenth aspect of the present invention, a method for determining a crank angle comprises measuring an angle of a crank arm using an external device while the crank arm is in a predetermined angular position. The method further comprises transmitting information with respect to the angle of the crank arm from the external device to a bicycle component having the crank arm and a storage device.

Advantageously according to the sixteenth aspect of the present invention, the method provides an easy way of measuring an angle of a crank arm when the bicycle does not include a crank angle measuring device such as an inclinometer.

In accordance with a seventeenth aspect of the present invention, the method according to the sixteenth aspect further comprises rotating the crank arm which is mounted to a bicycle to the predetermined angular position.

Advantageously according to the seventeenth aspect of the present invention. the crank arm can be easily placed at the predetermined angular position.

In accordance with an eighteenth aspect of the present invention, the method according to the seventeenth aspect further comprises receiving an indication indicating that the crank arm is at the predetermined angular position.

Advantageously according to the eighteenth aspect of the present invention, the predetermined angular position of the crank arm can be reliably obtained.

In accordance with a nineteenth aspect of the present invention, in the method according to the eighteenth aspect, the indicating comprises lighting.

Advantageously according to the nineteenth aspect of the present invention, the user can visually determine when the crank arm is at the predetermined angular position.

In accordance with a twentieth aspect of the present invention, in the method according to the eighteenth or nineteenth aspect, the indicating is executed by an indicator that is disposed on the crank arm.

Advantageously according to the twentieth aspect of the present invention, the visual indication can be conveniently seen when determining that the crank arm is at the predetermined angular position.

In accordance with a twenty-first aspect of the present invention, in the method according to any one of the sixteenth to twentieth aspects, the measuring of the angle includes coupling the external device to the crank arm mechanically while the crank arm is at the predetermined angular position.

Advantageously according to the twenty-first aspect of the present invention, the predetermined angular position of the crank arm can be reliably obtained by using the external device.

In accordance with a twenty-second aspect of the present invention, in the method according to any one of the sixteenth to twenty-first aspects, the measuring of the angle of the crank arm includes calculating of the crank angle using a software application of the external device.

Advantageously according to the twenty-second aspect of the present invention, the calculation of the angle of the crank arm can be performed by the external device such that the bicycle crank assembly can have a simpler configuration so that it is more cost efficient to manufacture.

In accordance with a twenty-third aspect of the present invention, in the method according to any one of the sixteenth to twenty-second aspects, the reaching of the predetermined angular position is determined by a position sensor provided on the crank arm.

Advantageously according to the twenty-third aspect of the present invention, the method provides an easy and inexpensive way of determining the predetermined angular position of the crank arm.

In accordance with a twenty-fourth aspect of the present invention, a method for determining a crank angle comprises measuring at least one of a pedaling force and a pedaling torque applied to the bicycle crank assembly. The method further comprises determining an angle of the crank arm based on the at least one of the pedaling force and the pedaling torque without an angle detector installed on the bicycle crank assembly.

Advantageously according to the twenty-fourth aspect of the present invention, the method provides an easy way of measuring an angle of a crank arm when the bicycle does not include a crank angle measuring device such as an inclinometer.

In accordance with a twenty-fifth aspect of the present invention, in the method according to the twenty-fourth aspect, the measuring further comprises detecting a signal from at least one strain sensor configured to be mounted onto a bicycle component of a bicycle crank.

Advantageously according to the twenty-fifth aspect of the present invention, the method can easily detect a pedaling force applied to the crank arm.

In accordance with a twenty-sixth aspect of the present invention, in the method according to the twenty-fourth or twenty-fifth aspect, the determining further comprises comparing the at least one of the pedaling force and the pedaling torque to a pre-stored relationship relating to the pedaling torque and a crank angle of a crank arm.

Advantageously according to the twenty-sixth aspect of the present invention, the method can estimate the crank angle of the crank arm based on at least one of the pedaling force and the pedaling torque without directly measuring the crank angle of the crank arm.

In accordance with a twenty-seventh aspect of the present invention, in the method according to the twenty-sixth aspect, the determining further comprises calculating the crank angle by comparing the at least one of pedaling force and the pedaling torque detected by the strain sensor to the information of the pre-stored relationship.

Advantageously according to the twenty-seventh aspect of the present invention, the method can estimate the crank angle of the crank arm based on at least one of the pedaling force and the pedaling torque without directly measuring the crank angle of the crank arm.

Also, other objects, features, aspects and advantages of the disclosed bicycle electric device will become apparent to those skilled in the art from the following detailed description, which, taken in conjunction with the annexed drawings, discloses one illustrative embodiment of the bicycle electric device.

BRIEF DESCRIPTION OF THE DRAWINGS

Referring now to the attached drawings which form a part of this original disclosure:

FIG. 1 is a flow diagram illustrating a process executed by a processor of the bicycle electric device for obtaining angular pedaling force information using the crank angle information obtained in FIG. 10 and displaying information to the rider or user;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
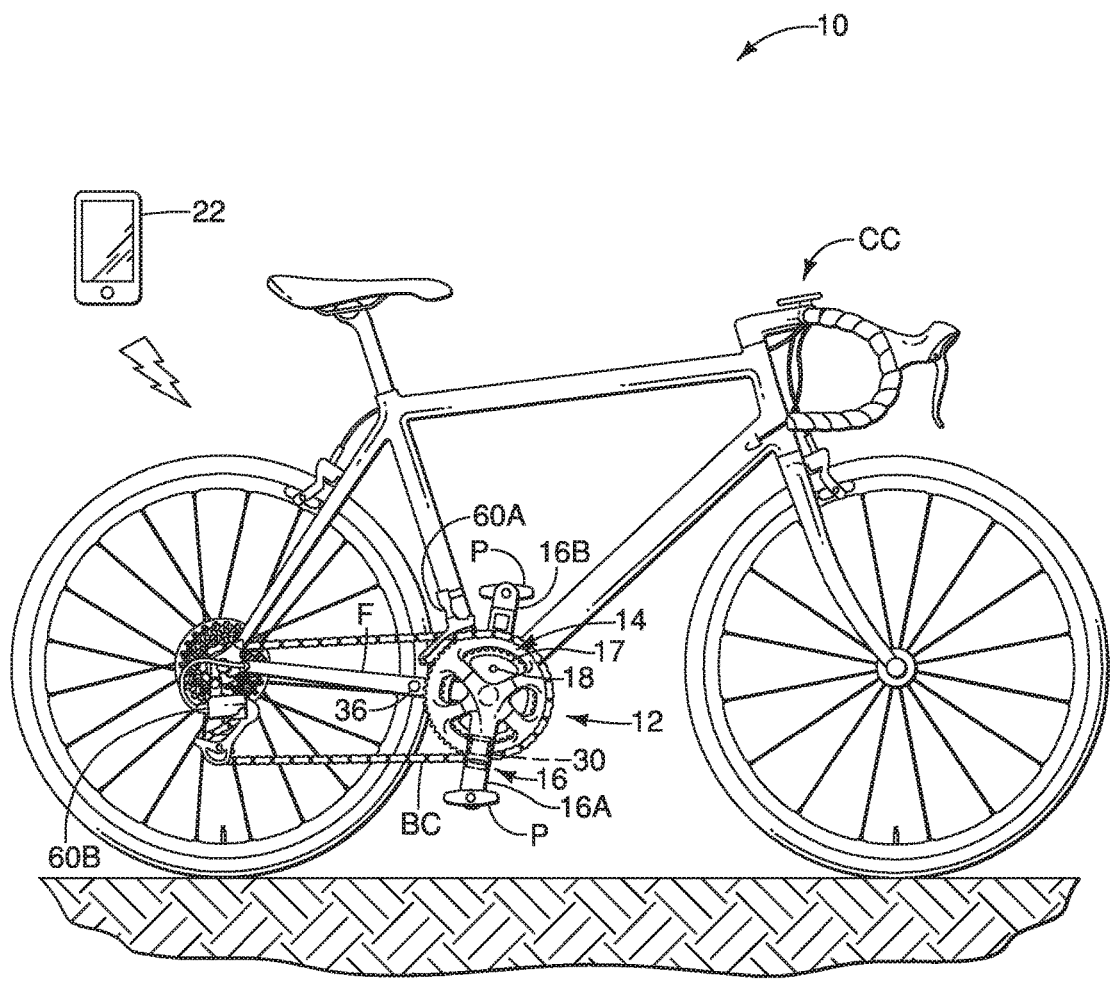
FIG. 1 is a side elevational view of a bicycle having a bicycle crank assembly that is equipped with a bicycle electric device in accordance with one illustrated embodiment.
Figure 2:
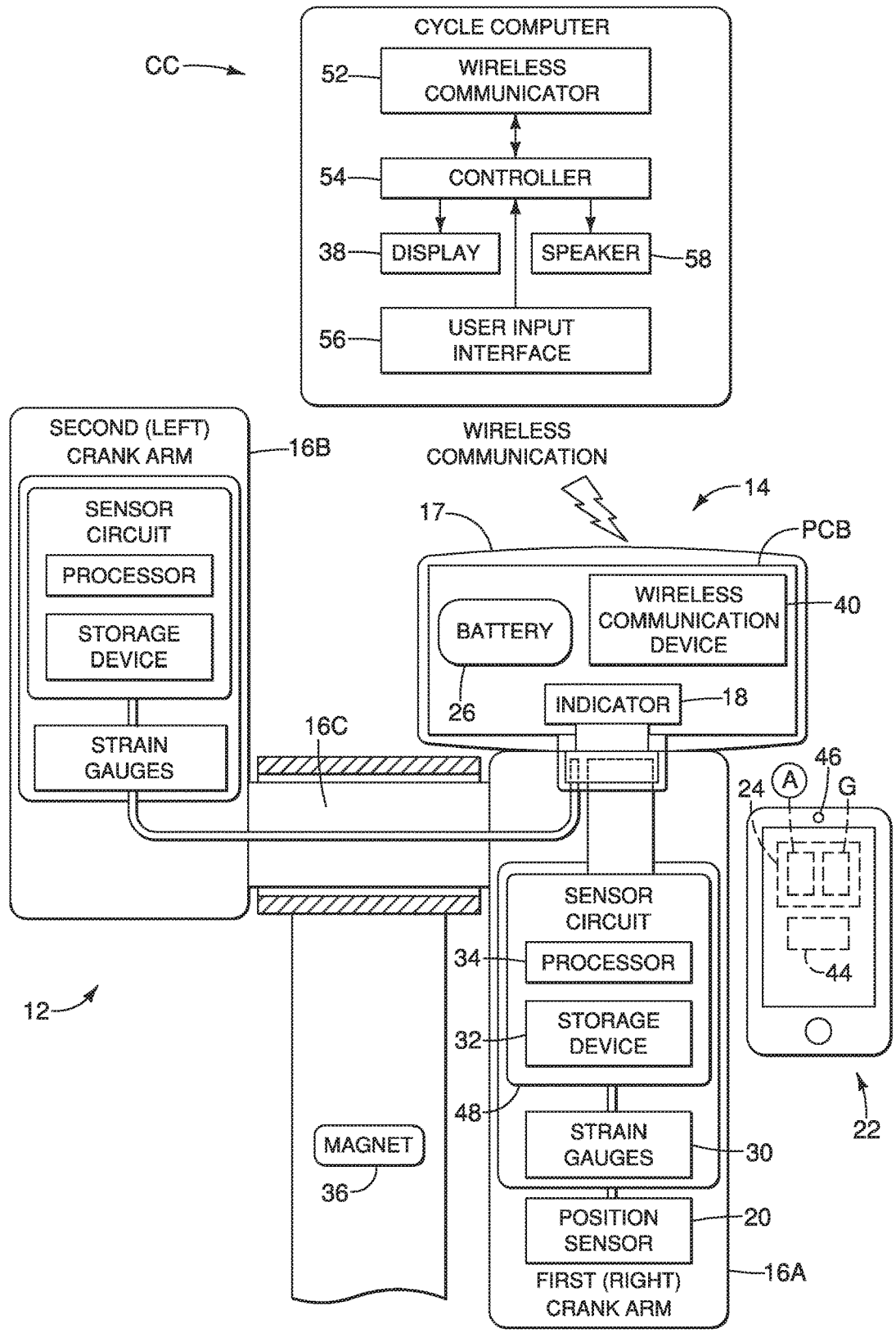
FIG. 2 is a block diagram of the bicycle crank assembly and the bicycle electric device illustrated in FIG. 1 in wireless communication with a cycle computer.
Figure 3:
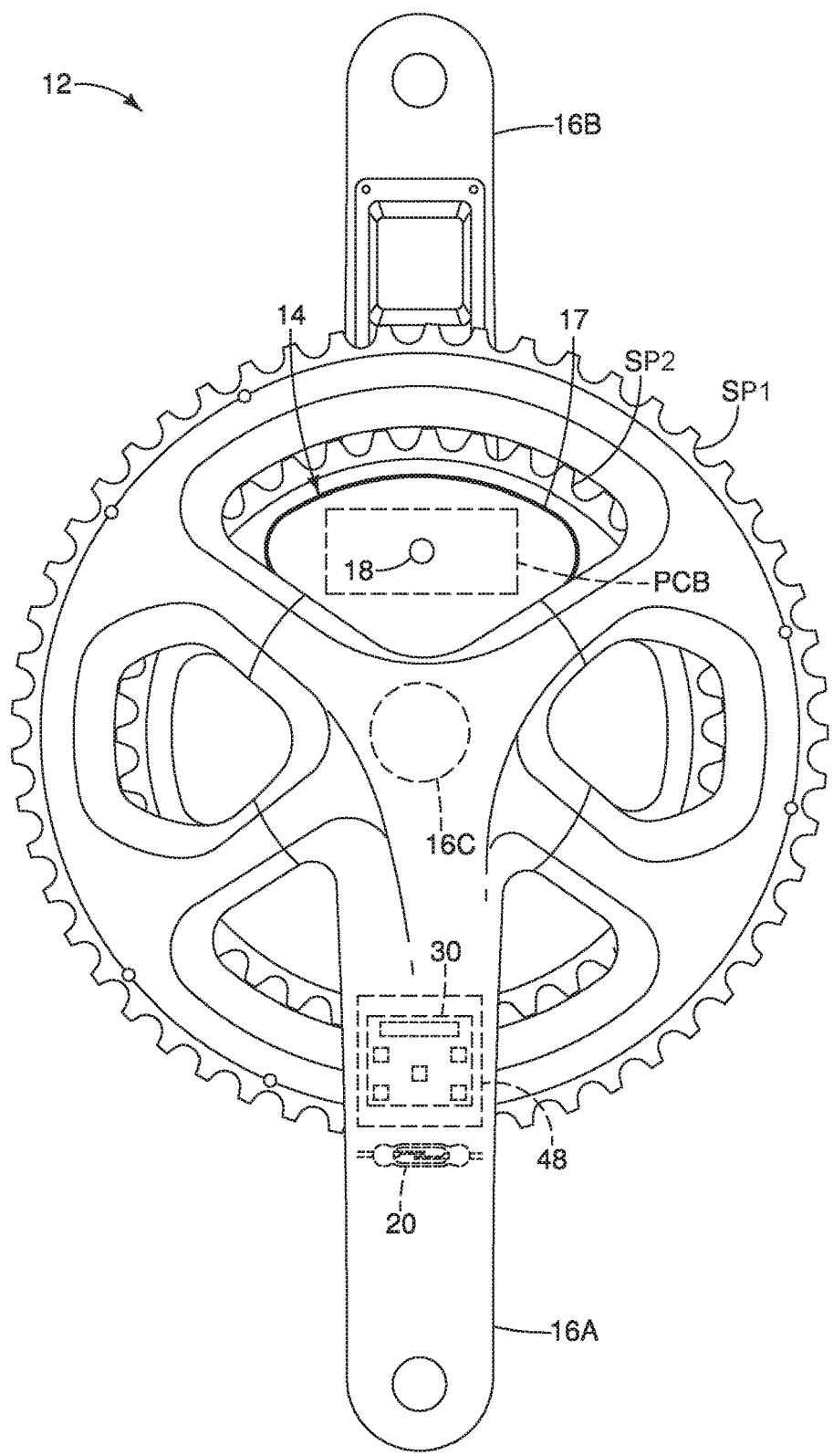
FIG. 3 is an outside elevational view of the bicycle crank assembly illustrated in FIGS. 1 and 2 with the bicycle electric device disposed on a sprocket mounting portion of a crank arm.

Referring initially to FIGS. 1 to 3, a bicycle 10 is illustrated that is equipped with a bicycle crank assembly 12 having a bicycle electric device 14. As shown in FIG. 1, the bicycle 10 illustrated is a road style bicycle having various electrically-controlled components. Of course, it will be apparent to those skilled in the art from this disclosure that the bicycle crank assembly 12 and/or the bicycle electric device 14 can be implemented with other types of bicycles as needed and/or desired. The bicycle electric device 14 is provided to the bicycle crank assembly 12, and is configured to aid in determining a crank angle of the bicycle crank assembly 12 as discussed below. The bicycle crank assembly 12 is rotatably mounted to a bicycle frame F in a conventional manner. The bicycle crank assembly 12 comprises, among other things, a first or right crank arm 16A, a second or left crank arm 16B and a crankshaft 16C. As seen in FIGS. 2 and 3, the first and second crank arms 16A and 16B are rigidly connected by the crankshaft 16C. The crankshaft 16C is preferably made of a hollow shaft. A bicycle pedal P is rotatably attached to each of the first and second crank arms 16A and 16B. The first crank arm 16A includes a pair of bicycle sprockets SP1 and SP2. When a rider applies a force on the bicycle pedals P during riding, a pedaling force or a pedaling torque is transmitted to the first and second crank arms 16A and 16B. The first and second crank arms 16A and 16B rotate the bicycle sprockets SP1 and SP2 to move a bicycle chain BC and propel the bicycle 10 in a conventional manner. For simplicity, the first crank arm 16A will hereinafter be referred to simply as "the crank arm 16A".

The bicycle electric device 14 has a housing unit 17 that is detachably mounted to the crank arm 16A. Alternatively, the housing unit 17 can be fixedly mounted to the crank arm 16A. As discussed below, the bicycle electric device 14 comprises an indicator 18 that is configured to generate a user signal indicating that the crank arm 16A is at a predetermined angular position. The bicycle electric device 14 further comprises a position sensor 20 that is configured to be provided on the bicycle crank assembly 12 to detect the predetermined angular position of the crank arm 16A with respect to the bicycle frame F. In the first embodiment, the indicator 18 is part of the housing unit 17 that is configured to be installed on the crank arm 16A, while the position sensor 20 is installed on the crank arm 16A and electrically connected to a printed circuit board PCB that is disposed inside the housing unit 17. The position sensor 20 can be permanently mounted on the crank arm 16A such that the bicycle crank assembly 12 and the bicycle electric device 14 are integrated together. Alternatively, the position sensor 20 can be detachably mounted on the crank arm 16A such that the housing unit 17 and the position sensor 20 are retrofitted to the crank arm 16A. The position sensor 20 can be mounted on the printed circuit board PCB that is disposed inside the housing unit 17.

As seen in FIGS. 1 and 2, the bicycle electric device 14 further comprises a mobile device 22. Here, in the first embodiment, the mobile device 22 is a "smart" mobile cellular telephone that is one example of an external device used for detecting the predetermined angular position of the crank arm 16A with respect to the bicycle frame F. In the first embodiment, the mobile (external) device 22 includes an inclinometer 24 for measuring the crank angle of the crank arm 16A when the crank arm 16A is at the predetermined angular position, as will be further discussed below. Typically, a "smart" mobile cellular telephone is provided with an accelerometer A and a gyroscope G. Hereinafter, the term "crank angle" refers to an angle of the crank arm 16A with respect to a horizontal plane with the bicycle 10 disposed in an upright position on a horizontal (level) surface, and the crank arm 16A being installed on the bicycle 10. However, it will be apparent to those skilled in the art from this disclosure that the crank angle can be calculated when the bicycle 10 is on an inclined surface by compensating for the incline. The compensation will be further discussed below.

While the bicycle crank assembly 12 is illustrated as containing the above components, it will be apparent to those skilled in the art from this disclosure that the present invention can be practiced with a more simplistic system. For example, the bicycle electric device 14 can be provided to the bicycle crank assembly 12 that is already equipped with the crank arm 16A and the position sensor 20. Thus, the present system can be implemented by providing the bicycle electric device 14 having just the indicator 18 to the bicycle crank assembly 12. The indicator 18 is connectable to a power source (e.g., a battery 26) and the position sensor 20 that detects the predetermined angular position.

As shown in FIG. 2, the bicycle electric device 14 further comprises at least one strain sensor 30 that is disposed on the crank arm 16A and configured to detect a pedaling force applied to the crank arm 16A. The strain sensor 30 includes one of a strain gage, a semiconductor strain sensor and a piezoelectric sensor. Here, the bicycle electric device 14 further comprises a plurality of the strain sensors 30. The strain sensors 30 can be a non-separable part of the crank arm 16A or can be configured as an add-on part that is detachably mounted to the crank arm 16A. In other words, the parts (e.g., the strain sensors 30) of the bicycle electric device 14 can be configured for retro-fitting the crank arm 16A, or can be configured to be integrated into the bicycle crank assembly 12 so that some parts are separable parts while other parts are non-separable parts.

As shown in FIG. 2, the bicycle electric device 14 further comprises a storage device 32 that is operatively coupled to the crank arm 16A. As discussed below, the storage device 32 stores various data and/or programs that are used in connection with providing pedaling information to a rider or a user. The storage device 32 can be a ROM (Read Only Memory) device and RAM (Random Access Memory) device or flash drive.

Also, as shown in FIG. 2, the bicycle electric device 14 further comprises a processor 34 that is configured to process the pedaling force detected by the strain sensors 30 to calculate angular force information.

Further, as shown in FIG. 2, the bicycle electric device 14 further comprises a magnet 36 that is configured to be mounted on the bicycle frame F. The magnet 36 actuates the position sensor 20, as will be discussed below.

As shown in FIG. 2, the bicycle electric device 14 further comprises a cycle computer CC. Here, in the first embodiment, the cycle computer CC is configured to wireless communicate with the bicycle electric device 14 as discussed below. The cycle computer CC has a display 38 that is configured to receive the angular force information calculated by the processor 34 and configured to display the angular force information on the display 38. The cycle computer CC is in communication with the bicycle crank assembly 12 and/or the external device 22 to receive information from the bicycle crank assembly 12 and/or the external device 22 and to display pedaling information on the display 38, as will be further discussed below.

The bicycle electric device 14 further comprises a wireless communication device 40. The wireless communication device 40 is disposed on the printed circuit board PCB that is disposed in the housing unit 17. As mentioned above, the housing unit 17 is mounted to the crank arm 16A. In this way, the wireless communication device 40 is operatively coupled to the crank arm 16A. The wireless communication device 40 can be equipped with Bluetooth technology, including Bluetooth low energy, or include the wireless protocol ANT+. The bicycle electric device 14 can also include an antenna (not shown) to transmit information from the bicycle electric device 14 and to receive information from the cycle computer CC and the mobile device 22.

Preferably, the bicycle electric device 14 further includes the battery 26 for supplying electrical power to the components of the bicycle electric device 14. The battery 26 is disposed in the housing unit 17 and electrically coupled with the printed circuit board PCB. Alternatively, the battery 26 can be disposed in the hollow crankshaft 16C. Also, the housing unit 17 can include a charge receiver port (not shown) that can receive a charger component. The charge receiver port can be a universal serial bus. The charge receiver port can also be implemented as an alternative to the wireless communication device 40 for transmitting information and/or signals to and from the bicycle electric device 14.

In the illustrated embodiment, the bicycle electric device 14 is disposed on a sprocket mounting portion of the crank arm 16A. It will be apparent to those skilled in the art from this disclosure that the bicycle electric device 14 can be located on various locations of the crank arm 16A as needed and/or desired.

It has been found that riders would like to be informed of the angular force components of the pedaling force during riding. In order to determine these angular force components, the crank angle as described above may be required. If the bicycle 10 is not equipped with the inclinometer 24, the user can utilize the mobile (external) device 22 having the inclinometer 24 to determine the crank angle. The mobile (external) device 22 is in communication with the bicycle electric device 14 to transmit information regarding the calculated crank angle. The bicycle electric device 14 then transmits the information to the processor 34 that will process the information to generate angular force information related to pedaling. Alternatively, the cycle computer CC includes a processor that receives information from the external device 22 regarding the crank angle. It will be apparent to those skilled in the art from this disclosure that the various electrical components provided on the bicycle 10 and the mobile (external) device 22 can carry out electric communication in a variety of ways and routes, which are not limited to the embodiment shown.

A method for determining a crank angle utilizing the components of the bicycle electric device 14 will now be discussed with reference to FIGS. 4 to 10. This method illustrates a user set-up process for determining the crank angle using the external device 22.

In step S1, the user rotates the crank arm 16A to the predetermined angular position. In the illustrated embodiment, the reaching of the predetermined angular position is determined by the position sensor 20 that is provided on the crank arm 16A. For example, the user can rotate the crank arm 16A from the position of FIG. 4 to the position of FIG. 5, which is an illustration of the predetermined angular position. As stated, the position sensor 20 is actuated by the magnet 36, which is mounted on the bicycle frame F. In particular, when the position sensor 20 is within proximity of the magnet 36, the indicator 18 indicates that the predetermined angular position has been reached.

Thus, in step S2, the user receives an indication indicating that the crank arm 16A is at the predetermined angular position. The indication can be in many forms. For example, the indicating can comprise lighting. The indication can also comprise a sound indication. The indication can also comprise both the lighting and the sound indication. The indicator 18 will be further discussed below. In the illustrated embodiment, the indicator 18 is disposed within the housing unit 17 of the bicycle electric device 14. Thus, the indicator 18 is disposed on the crank arm 16A. The interaction of the position sensor 20 with the magnet 36 and the indicator 18 will be further discussed below.

In step S3, the user stops rotation of the crank arm 16A upon reaching the predetermined angular position. Now, the indicator 18 is illuminated in the case of the first embodiment, and the crank arm 16A is held in the predetermined angular position.

Figure 5:
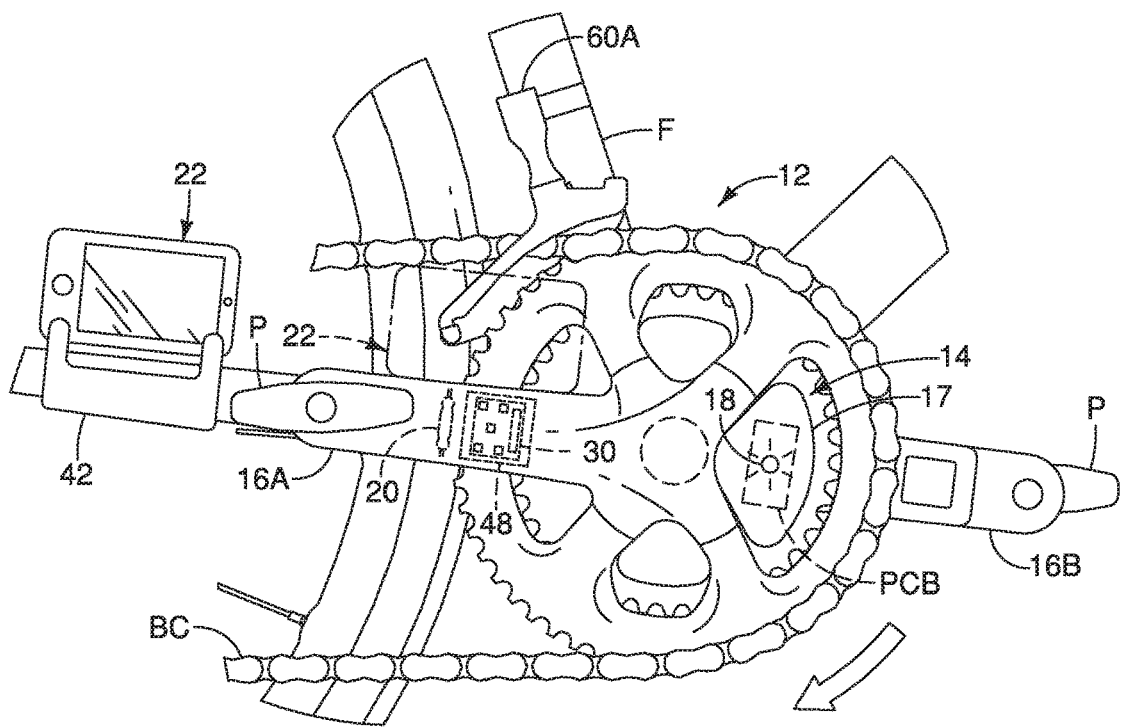
FIG. 5 is an enlarged side elevational view, similar to FIG. 4, of the portion of the bicycle illustrated in FIG. 4, but with the right crank arm of the bicycle crank assembly being at the predetermined angular position such that the indicator produces a user signal.

In step S4, and also seen in FIG. 5, the mobile (external) device 22 is positioned on the crank arm 16A as shown in broken lines, while the crank arm 16A is at the predetermined angular position to determine the crank angle. Thus, measuring of the crank angle includes positioning the mobile (external) device as described. To enhance accuracy of measurement of the crank angle, the crank arm 16A can include a stabilizing structure that receives the mobile (external) device 22. For example, the user can put the mobile (external) device 22 into a jig 42 that is mounted to or placed on the bicycle frame F or the crank arm 16A to measure the crank angle as shown in full lines in FIG. 5. Thus, the measuring of the crank angle includes coupling the external device 22 to the crank arm 16A mechanically while the crank arm 16A is at the predetermined angular position.

In step S5, the crank angle is measured using the external device 22. In other words, measuring of the crank angle of the crank arm 16A includes using the external device 22 while the crank arm 16A is in the predetermined angular position. Preferably, the external device 22 includes a software application that can carry out the measurements of the crank angle. Thus, the measuring of the crank angle of the crank arm 16A further includes calculating the crank angle using software application of the mobile (external) device 22. As stated above, if the bicycle 10 is on an incline, the crank angle can still be calculated by compensating for the incline. For example, the software application of the external device 22 can be programmed to compensate for the incline. The software application can perform the compensation mechanism by measuring the actual angle of the crank arm 16A and also measuring the tilt angle of the bicycle caused by the incline. The desired crank angle can be calculated by taking the difference of the measured actual angle and the tilt angle.

Alternatively, it will be apparent to those skilled in the art from this disclosure that instead of step S5, the user can manually measure the crank angle by using a measurement tool (e.g., a protractor). The software application of the mobile device 22 can include a user input interface that enables the user to input the angle information into the mobile device 22.

In step S6, the user then transmits information with respect to the crank angle of the crank arm 16A from the external device 22 to the crank arm 16A which has the storage device 32 that will store the crank angle information. The crank arm 16A also has the processor 34 that will process the crank angle information, as will be further discussed below. In the illustrated embodiment, the crank arm 16A is an example of a bicycle component having the storage device 32 that can receive the crank angle information. It will be apparent to those skilled in the art that the crank angle information can be transmitted to another bicycle component having a storage device 32. For example, the external device 22 can transmit the crank angle information to the cycle computer CC for display on the display 38. Also, as further explained below, further examples of the bicycle component can include shift operating devices and/or a drive assist unit.

The position sensor 20 and the magnet 36 will now be discussed with reference to FIGS. 4 to 9. The position sensor 20 is configured to be provided on the bicycle crank assembly 12 to detect the predetermined angular position of the crank arm 16A with respect to the bicycle frame F. In the illustrated embodiment as shown, the position sensor 20 is configured to be provided on the crank arm 16A. However, it will be apparent to those skilled in the art from this disclosure that the position sensor 20 can be fixed to any rotatable part of the bicycle crank assembly 12 such as the crankshaft 16C. As shown, the magnet 36 is disposed on the bicycle frame F. Preferably, the magnet 36 is disposed on the chainstay of the bicycle frame F. It will be apparent to those skilled in the art from this disclosure that the magnet 36 can be located on a variety of locations of the bicycle frame F that is stationary with respect to the crank arm 16A.

Figure 6:
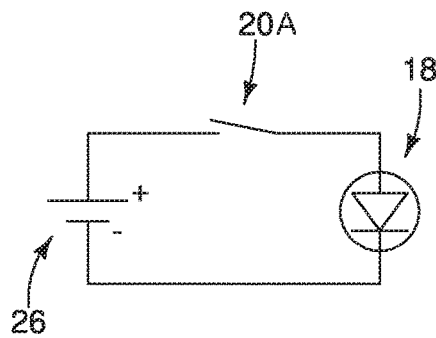
FIG. 6 is a simplified depiction of an electric circuit of the bicycle electric device illustrated in FIGS. 1 to 4 with the indicator being a light source and the electric circuit being open so that the light source (i.e., the indicator) does not illuminate (i.e., the indicator does not produce a user signal)
Figure 7:
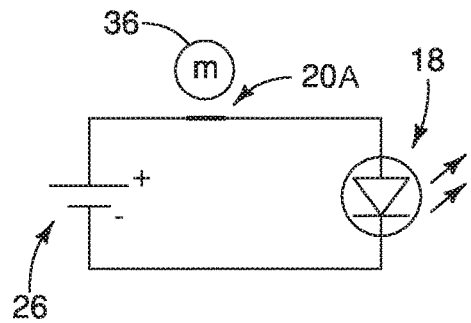
FIG. 7 is a simplified depiction of the electric circuit illustrated in FIG. 6 showing the electric circuit being closed by a magnet being positioning adjacent the position sensor (i.e., a reed switch) so that the light source (i.e., the indicator) illuminates (i.e., produces a user signal)
Figure 8:
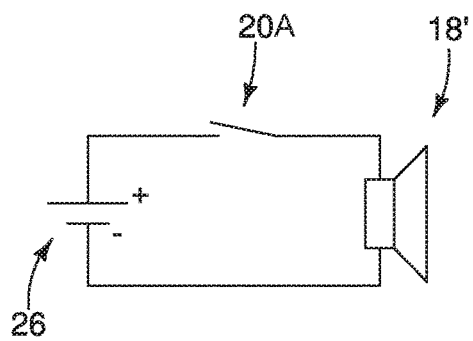
FIG. 8 is a simplified depiction of a modified electric circuit for the bicycle electric device illustrated in FIGS. 1 to 4 with the indicator being a sound source and the electric circuit being open so that the sound source (i.e., the indicator) does not emit a sound (i.e., the indicator does not produce a user signal)
Figure 9:
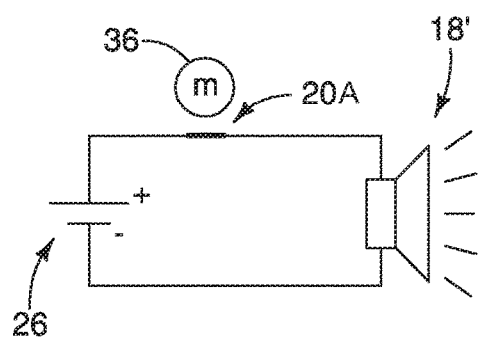
FIG. 9 is a simplified depiction of the modified electric circuit illustrated in FIG. 8 showing the electric circuit being closed by a magnet being positioning adjacent the position sensor (i.e., a reed switch) so that the sound source (i.e., the indicator) emit a sound (i.e., the indicator produces a user signal)
Figure 10:
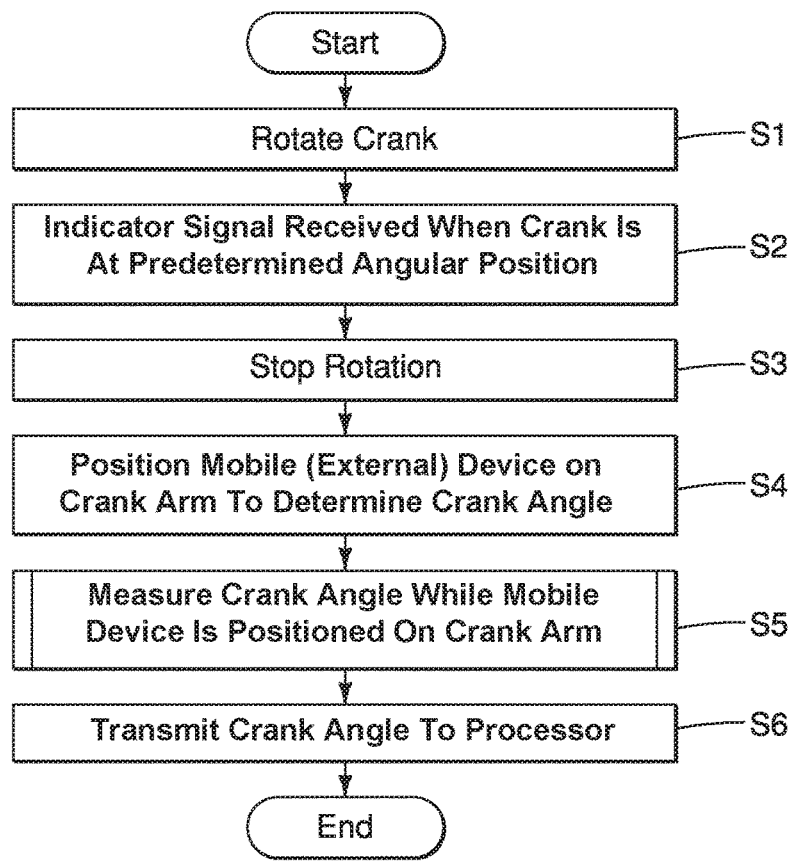
FIG. 10 is a flow diagram illustrating one example of user setup steps carried out in a method for obtaining crank angle information relating to the bicycle crank assembly illustrated in FIGS. 1 to 7.

In the illustrated embodiment, the position sensor 20 includes a reed switch 20A. The reed switch 20A is configured to interact with the magnet 36 in a conventional manner. Thus, as seen in FIGS. 4 to 9, the reed switch 20A is a magnetic switch that is actuated by the magnetic field of the magnet 36. The reed switch 20A and the magnet 36 are part of an electric circuit with the indicator 18 or 18'. Simplistic examples of the electric circuit are illustrated in FIGS. 6 to 9. That is, the reed switch 20A is electrically connected with the indicator 18 or 18' to send an electric signal to the indicator 18 or 18' upon actuation. When the user rotates the crank arm 16A from the position illustrated in FIG. 4 to the position illustrated in FIG. 5, the reed switch 20A is brought near the magnet 36. The magnet 36 emits the magnetic field that actuates the reed switch 20A to close the reed switch 20A such that the electric circuit closes, as seen in FIGS. 7 and 9. The closing enables electric current to flow through the electric circuit to the indicator 18 or 18' which emits the indication. The indication will be further discussed below.

Figure 4:
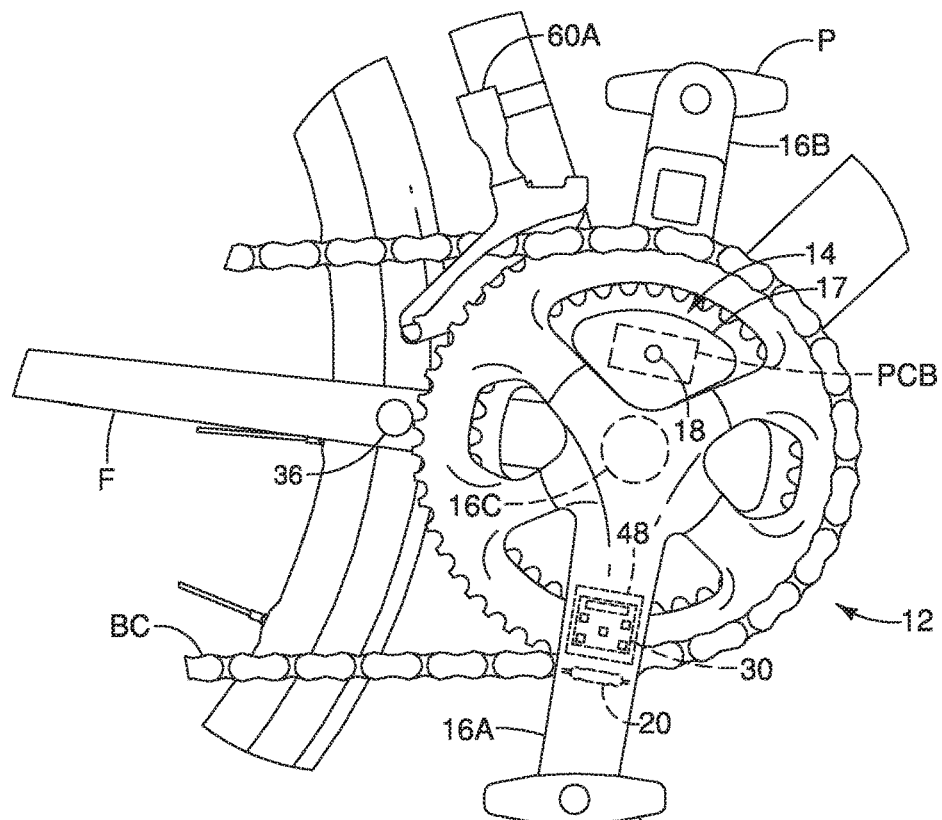
FIG. 4 is an enlarged side elevational view of a portion of the bicycle illustrated in FIG. 1 with a right crank arm of the bicycle crank assembly being in a non-detected position such that an indicator of the bicycle electric device is not producing a user signal.

In the illustrated embodiment, the predetermined angular position detected by the position sensor 20 includes a position of the bicycle crank assembly 12 in which the magnet 36 actuates the reed switch 20A when the bicycle crank assembly 12 is installed on the bicycle 10. That is, the electric circuit is closed when the bicycle crank assembly 12 is in the predetermined angular position (FIGS. 5, 7 and 9). The electric circuit is open when the bicycle crank assembly 12 is not in the predetermined angular position (FIGS. 4, 6 and 8). It will be apparent to those skilled in the art from this disclosure that the predetermined angular position can include a range of positions in which the reed switch 20A is actuated by the magnetic field emitted by the magnet 36. Thus, the position of the bicycle crank assembly 12 illustrated in FIG. 5 is an example of the predetermined angular position. In the illustrated embodiment, the predetermined angular position assumes that the electric circuit is connected, charged and fully operable. It will be apparent to those skilled in the art from this disclosure that the interaction of the reed switch 20A and the magnet 36 can be utilized to detect a cadence of the crank arm rotation.

In the illustrated embodiment, the position sensor 20 is a proximity sensor. That is, the reed switch 20A is actuated by the presence of a nearby object (e.g., the magnet 36) without any physical contact. Although the electric circuits illustrated utilize the reed switch 20A and the magnet 36 that emits a magnetic field, it will be apparent to those skilled in the art from this disclosure that the reed switch 20A and the magnet 36 can be replaced with other types of sensing components. For example, if desired, the position sensor 20 can be configured to detect electromagnetic radiation, radar or sonar. The position sensor 20 can also be a Hall effect sensor, an inductive sensor, ultrasonic sensor or a capacitive displacement sensor to detect the predetermined angular position.

Furthermore, the electric circuits of the illustrated embodiment are depicted as normally "open" circuits. That is, the electric circuits shown in FIGS. 6 and 8 are each in an open position when the reed switch 20A is not near the electromagnetic field of the magnet 36. In this position, no current flows through the circuit. However, it will be apparent to those skilled in the art that the electric circuits can be modified to be a normally "closed" circuit in which the reed switch 20A is closed without the magnet 36 in the vicinity if needed and/or desired.

The indicator 18 will now be discussed. As stated, the indicator 18 is configured to generate the user signal indicating that the crank arm 16A is at the predetermined angular position. Preferably, the indicator 18 is disposed on the bicycle crank assembly 12. As seen in FIGS. 2 and 3, the indicator 18 is illustrated as being housed in the housing unit 17 of the bicycle electric device 14. The indicator 18 can indicate via a light source or a sound source that is electrically connected to the position sensor 20 via any of the electric circuits.

As seen in FIGS. 6 and 7, the indicator 18 is a light source, preferably a light emitting diode. Thus, the indicator 18 can emit a light when the crank arm 16A is at the predetermined angular position. The indicator (light source) 18 can also include indications that are changes in color. For example, the indicator 18 can emit a red light when the crank arm 16A is not at the predetermined angular position. The indicator 18 can emit a green light when the crank arm 16A is at the predetermined angular position. Alternatively, the indicator (light source) 18 can increase or decrease in intensity to indicate that the crank arm 16A is at the predetermined angular position. Further, the indicator 18 can flash at different frequencies to indicate the predetermined angular position. As seen in FIGS. 8 and 9, instead of or in addition to the indicator 18, an indicator 18' can alternatively be used. Here, the indicator 18' includes a sound source that generates a sound signal (e.g., a beep) that indicates that the crank arm 16A is at the predetermined angular position. The indicator 18 and/or 18' is electrically connected to the battery 26 of the bicycle electric device 14. A processor, a memory and circuitry for controlling the indicator 18 and/or 18' can also be provided on the printed circuit board PCB of the bicycle electric device 14.

The mobile (external) device 22 will now be discussed primarily with reference to FIG. 2. As stated, the mobile device 22 includes the inclinometer 24 that measures the crank angle of the crank arm 16A at the predetermined angular position. Inclinometers measure the angle of an object with respect to the force of gravity. External accelerations like rapid motions, vibrations or shocks can introduce errors in the tilt measurements of the inclinometer 24. Thus, the inclinometer 24 includes at least one of the accelerometer A and the gyroscope G to overcome this problem. The mobile device 22 includes an external device processor 44 that is programmed to use one or both of the signals produced by the accelerometer A and the gyroscope G to obtain a value for the crank angle.

Examples of the mobile device 22 include a smartphone, a tablet or a personal computer. Preferably, as stated, the external device 22 includes at least one software application that is installed to detect, measure and/or send information regarding the crank angle.

As an alternative, instead of using the inclinometer 24, the external device 22 can include a measurement device 46 that detects a measured angle of the crank arm 16A. The measured angle is then processed by the external device processor 44 to calculate the crank angle based on measurement data. For example, the external device 22 can include a camera (i.e., the measurement device 46) for measuring the detected angle of the crank arm 16A based on an image data. The external device processor 44 can process the image(s) to extract a relative position of the crank arm 16A with respect to the bicycle frame F while the crank arm 16A is at the predetermined angular position, and then calculate the crank angle of the crank arm 16A at the predetermined angular position.

Preferably, the external device 22 is in wireless communication with either or both the bicycle electric device 14 and the cycle computer CC. For example, the external device 22 can transmit a measured crank angle and/or the crank angle with respect to the horizontal surface to the bicycle electric device 14 which transmits the information to the processor 34. The processor 34 disposed on the crank arm 16A can also calculate crank angle based on crank angle information received from the external device 22. The processor 34 can also calculate the angular force information that is then transmitted to the cycle computer CC for display. Alternatively, the cycle computer CC can be equipped with a processor (not shown) programmed to calculate the crank angle and/or the angular force.

The strain sensor 30 will now be discussed with reference to FIGS. 2 and 3. The strain sensor 30 is configured to detect the pedaling force applied to the crank arm 16A. The strain sensor 30 can be disposed on the bicycle crank assembly 12 at a variety of locations to detect the pedaling force. For example, the strain sensor 30 can be disposed on the crank arm 16A using conventional techniques to detect different torque components acting on the crank arm 16A during pedaling. The strain sensor 30 can be disposed and utilized in a similar manner as taught in U.S. Patent Application Publication No. 2014/0060212 which also teaches various configurations of strain sensors mounted to a crank arm. The strain sensor 30 can be mounted on both of the first and second crank arms 16A and 16B in a variety of arrangements to obtain the pedaling force of both of the first and second crank arms 16A and 16B.

Alternatively, the strain sensor 30 can be disposed on the crankshaft 16C. For example, U.S. Patent Application Publication No. 2015/0120119 discloses mounting a strain sensor or torque sensor onto a crankshaft. As another alternative, the strain sensor 30 can be disposed on the bicycle pedal P that is provided with the bicycle crank assembly 12. That is, the indicator 18 can be utilized with the bicycle crank assembly 12 and the bicycle pedals P having strain sensors preinstalled on the bicycle pedals P. For example, U.S. Patent Application Publication No. 2016/0052583 discloses various configurations of strain sensors that are disposed on a pedal spindle.

In the illustrated embodiment, the crank arm 16A includes a plurality of the strain sensors 30. The strain sensors 30 are connected to a sensor circuit 48 for measuring the pedaling force applied to the crank arm 16A. The sensor circuit 48 can include amplifier circuits (not shown) to amplify the signals received by the strain sensors 30. The sensor circuit 48 can include analog digital converter (not shown) to convert analog signals received by the strain sensors 30 to digital signals. The wireless communication device 40 is electrically connected to the sensor circuit 48 for receiving signals indicative of the pedaling force applied to the crank arm 16A. In other words, the sensor circuit 48 is configured to interpret the strain signal(s) to generate pedaling force information that is transmitted to the cycle computer CC via the wireless communication device 40. Preferably, the second crank arm 16B includes a plurality of strain sensors and a sensor circuit that are similar to the crank arm 16A. The second crank arm 16B can include a plurality of strain sensors and a sensor circuit are similar to the crank arm 16A without including the processor 34 and storage device 32. In this case, the plurality of strain sensors and the sensor circuit of the second crank arm 16B is electrically connected to the processor 34 and storage device 32 of the first crank arm 16A.

Figure 11:
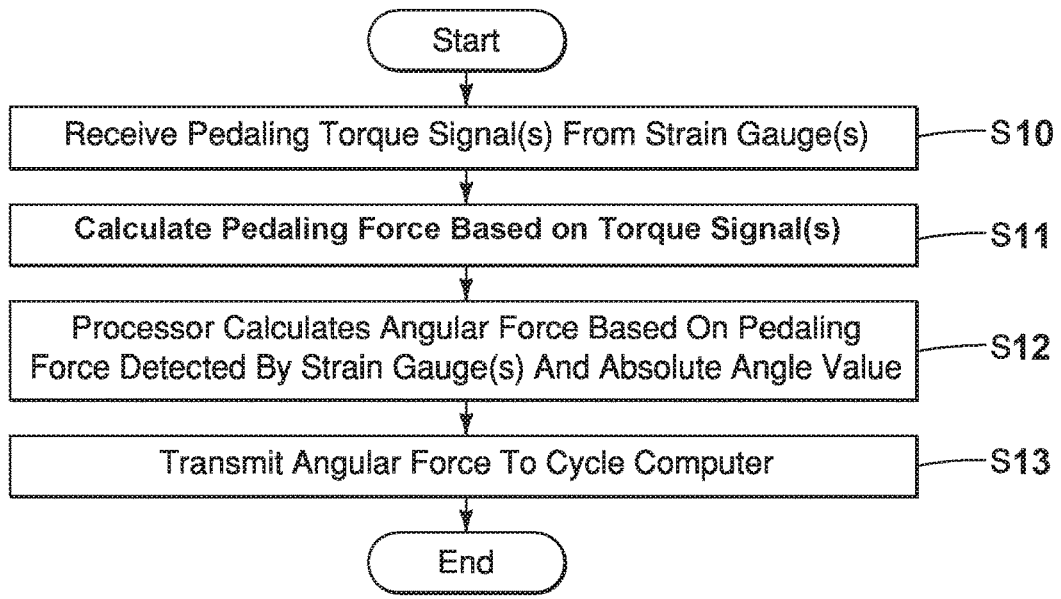

The processor 34 will now be discussed with reference to FIGS. 2 and 11. In the illustrated embodiment, the following functions are described as being functions of the processor 34 that is disposed on the crank arm 16A. However, as stated above, these functions can be performed by the external device processor 44 and/or a processor of the cycle computer CC. The following steps relate to obtaining the angular pedaling information during pedaling using information regarding the crank angle obtained during user setup. As stated, the strain sensor 30 detects the pedaling force or pedaling torque. In step S10, the processor 34 receives pedaling force signals from the strain sensors. The processor 34 receives pedaling force signals from the strain sensors 30 and stores the data in the storage device 32. The storage device 32 can also include pre-stored data as will be discussed below. Thus, the storage device 32 is operatively coupled to the crank arm 16A.

In step S11, the processor 34 calculates the pedaling force from the pedaling force signals received from the strain sensors 30.

The processor 34 is configured to process the pedaling force detected by the strain sensor 30 to calculate angular force information, which occurs in step S12. Examples of angular force information that can be calculated by the processor 34 include the tangential force Fθ and the radial force Fr. The tangential force Fθ is the force applied in the direction of the rotation of the crank and the radial force Fr in the direction normal to the crank. An actual pedaling force is a composite sector of the tangential force Fθ and the radial force Fr.

The processor 34 can include a timer circuit (not shown) so that the processor 34 can continuously calculate angular force information during pedaling based on pre-set sample times. The processor 34 can be programmed to calculate the angular force based on pedaling force using similar methods as taught in U.S. Pat. No. 9,010,201. The angular force information is then transmitted to the cycle computer CC by the wireless communication device 40, in step S3.

Figure 12:
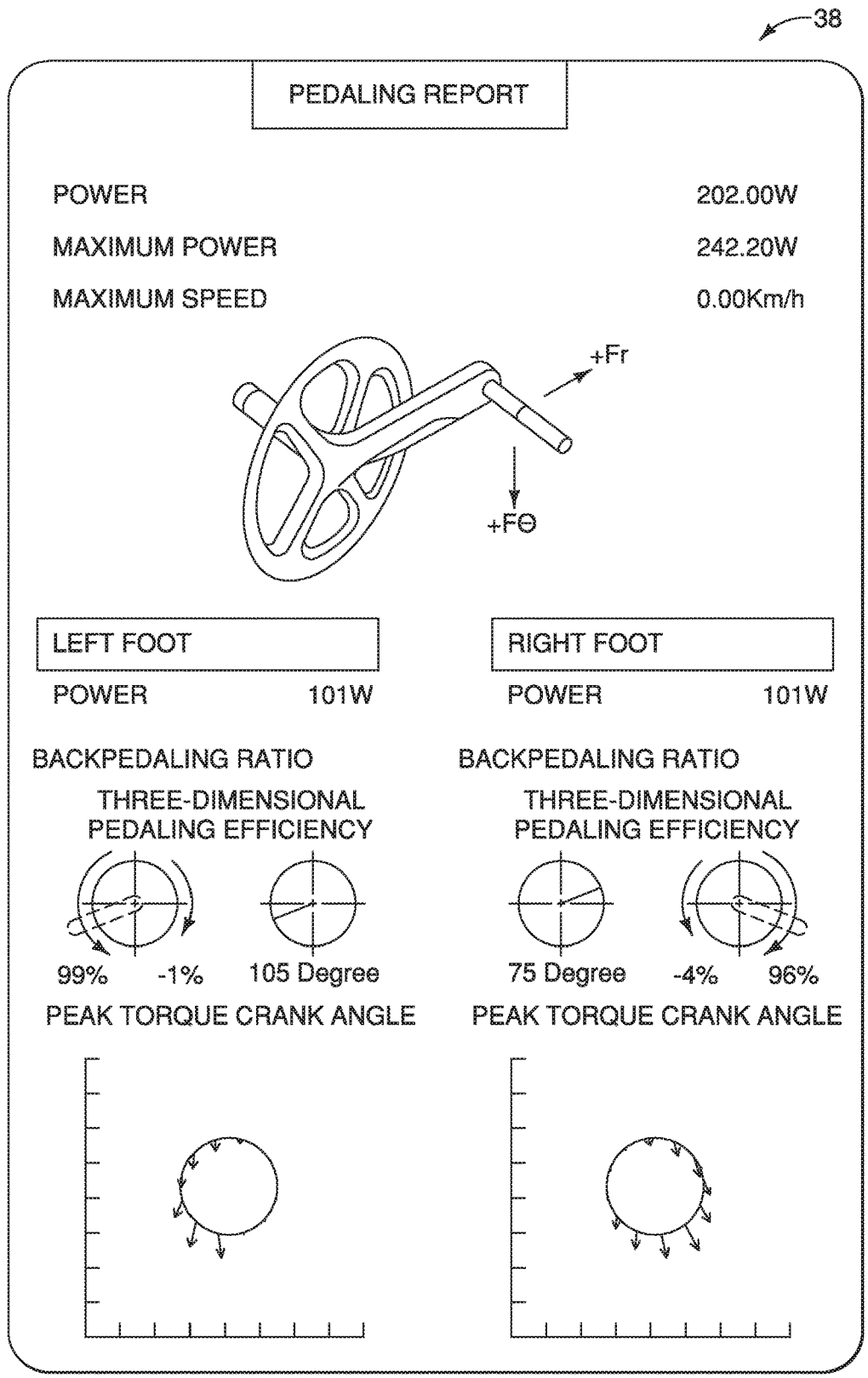
FIG. 12 is an elevational view of a display of the cycle computer illustrated in FIG. 2 showing one example of a display based on information from the angular force information obtained from the steps of FIG. 11.

The cycle computer CC will now be discussed with reference to FIGS. 2 and 12. As previously mentioned, the cycle computer CC has the display 38. The cycle computer CC is configured to receive the angular force information calculated by the processor 34. The cycle computer CC is configured to display the angular force information on the display 38. The display 38 will be further discussed below.

In the first illustrated embodiment, the cycle computer CC comprises a two-way wireless communicator 52 (i.e., a wireless receiver-wireless transmitter) and a controller 54. The controller 54 is a microcomputer that includes a central processing unit (CPU) or processor and other conventional components such as an input interface circuit, an output interface circuit, and storage devices such as ROM (Read Only Memory) device and RAM (Random Access Memory) device. Typically, the cycle computer CC includes a user interface 56 and a speaker 58 in addition to the display 38. Also, the controller 54 is programmed to display the pedaling force information on the display 38. The controller 54 can include other programs as needed and/or desired. For example, the controller 54 can include an automatic shifting program for automatically shifting gears of the bicycle 10 based on the pedaling force information and/or other bicycle riding conditions that are detected with other sensors (not shown).

The display 38 will now be discussed with reference to FIG. 12. The display 38 displays various information. For example, the display 38 can display the speed of the bicycle 10, positional information, (average) power, (average) amount of loss and so forth. Here, "power" means an amount of the energy per unit time due to the force applied in the direction of the rotation of the crank. The bicycle 10 is driven by this power. Meanwhile, "amount of loss" means force applied in a different direction from the direction of the rotation of the crank arm 16A. This force is wasted force that does not contribute to the drive of the bicycle 10. Therefore, the user can more efficiently drive the bicycle 10 by increasing power and decreasing an amount of loss as much as possible.

Backpedaling efficiency can be displayed along with a graphic representing the crank arm 16A to indicate the proportional forces being applied in the forward rotational direction and the reverse rotational direction of the crank arm 16A. For example, the proportional force being applied in the forward rotational direction of the right crank arm 16A is 96%, and the proportional force being applied in the reverse rotational direction is 4%. Peak torque crank angle indicates that the crank angle torque is at maximum. The display information illustrated in FIG. 12 are mere examples. It will be apparent to those skilled in the art from this disclosure that the display 38 can include different, additional or simpler information as needed and/or desired.

In addition, the bicycle 10 of FIG. 1 can be further provided with first and second transmission devices 60A and 60B (e.g., front and rear derailleurs). The derailleurs 60A and 60B can be electrically controlled by the automatic shifting program of the cycle computer CC. The controller 54 can be programmed to move the derailleurs 60A and 60B upon determining that the crank angle is at a predetermined crank angle.

Additionally, the bicycle 10 can be further equipped with a drive assist unit (not shown) having an assist motor. The assist motor can be configured to assist propelling the bicycle 10 by a manual drive force that rotates the crankshaft 16C. The drive assist unit can be electrically operable by the controller 54 of the cycle computer CC. The controller 54 can be programmed to increase or reduce an output from the assist motor based on at least one of the manual drive force, the crank angle and the cadence of the crank arm rotation. The controller 54 can be programmed to increase or reduce an output from the assist motor upon the crank angle becoming a predetermined angle.

Figure 13:
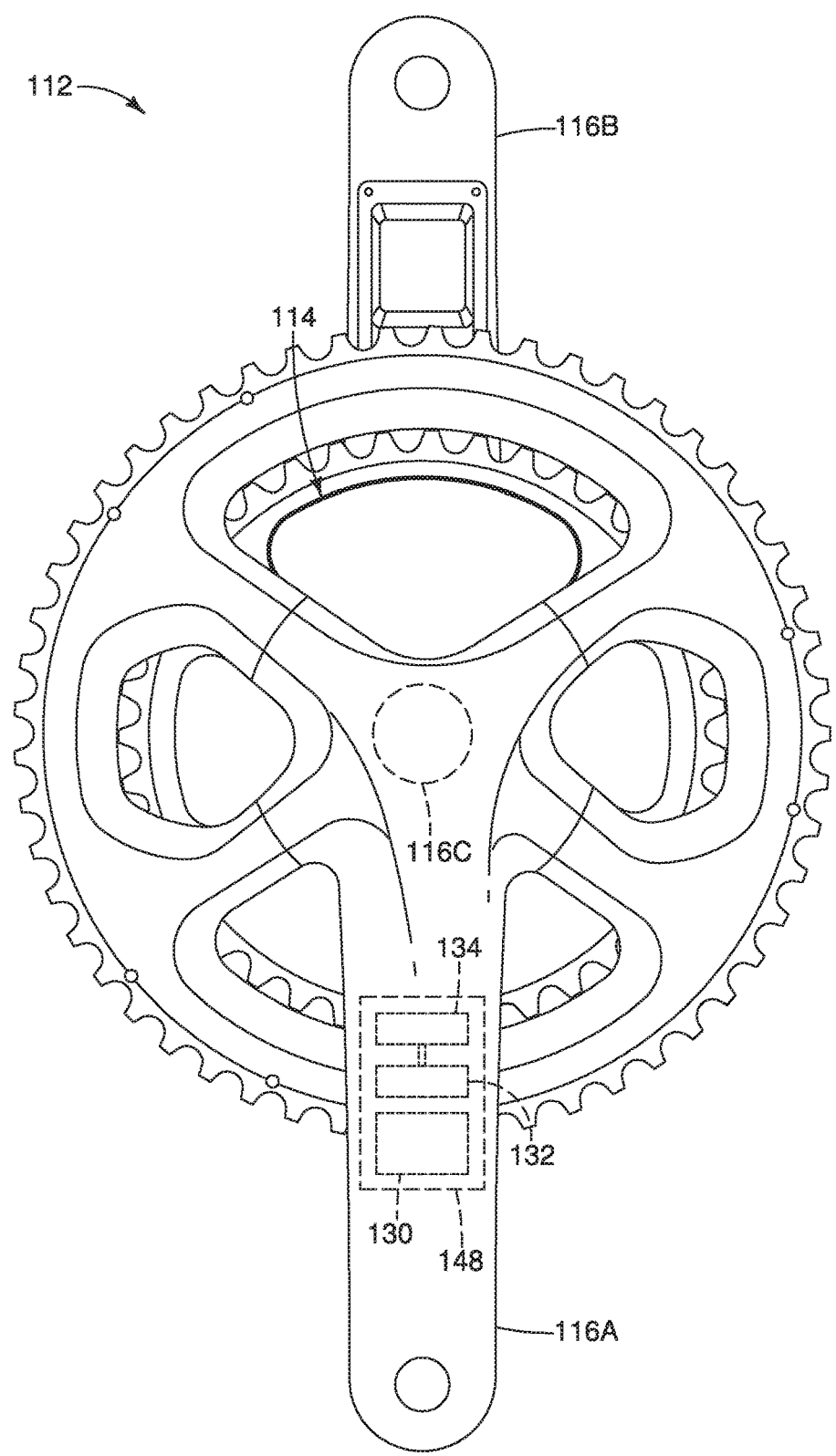
FIG. 13 is an outside elevational view of a modified bicycle crank assembly having a strain sensor disposed on a right crank arm and a bicycle electric device without an indicator disposed on a sprocket mounting portion.
Figure 15:
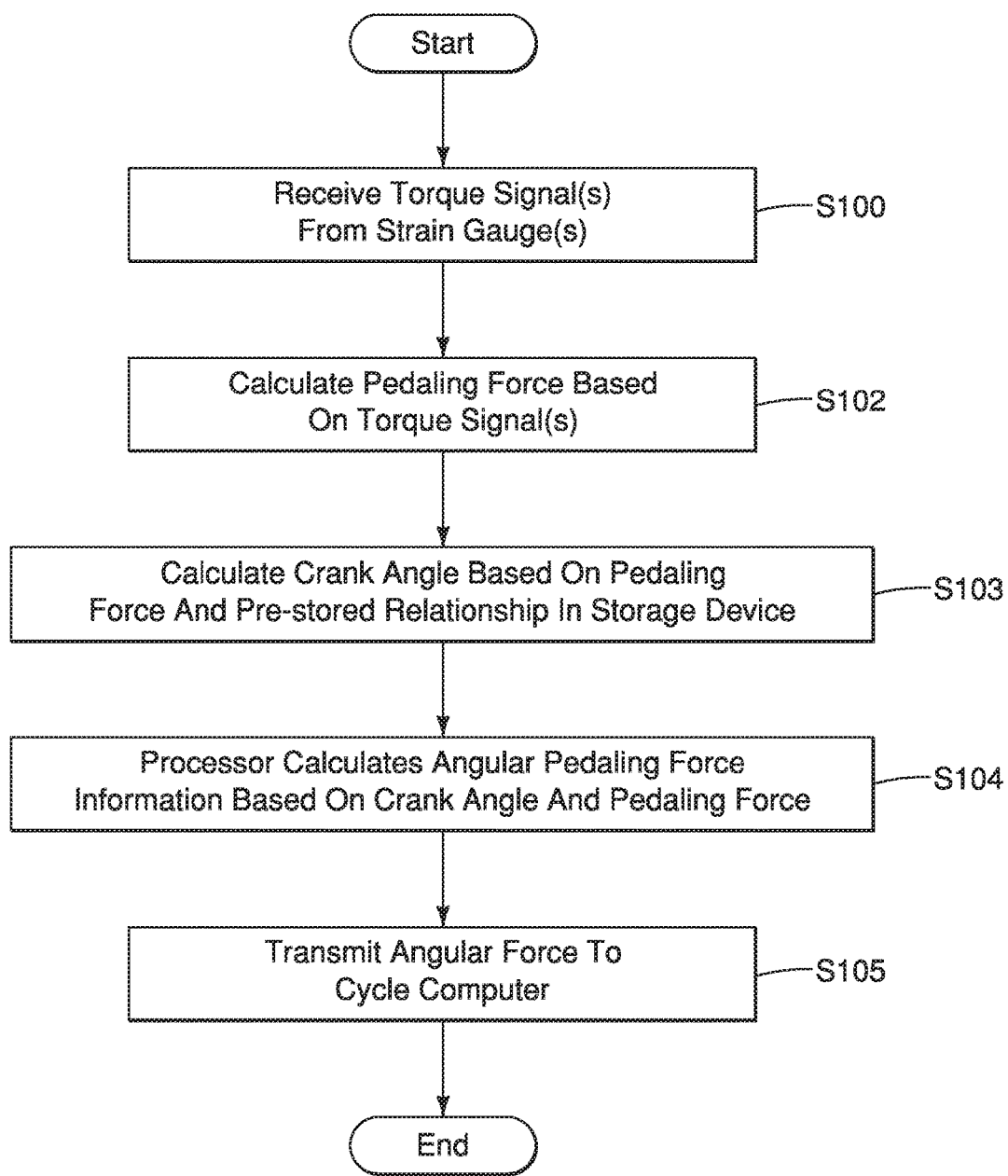
FIG. 15 is a flow diagram illustrating a process executed by a processor of the bicycle electric device of FIG. 13 for determining angular pedaling force information using the pre-stored information illustrated in FIG. 14.

Referring now to FIGS. 13 and 15, a method for determining the crank angle without the use of the external device 22 and the inclinometer 24 will now be discussed. The method can be used with a bicycle crank assembly 112. The bicycle crank assembly 112 comprises, among other things, a first or right crank arm 116A, a second or left crank arm 116B and a crankshaft 116C. The crank arm 116A is provided with a plurality of strain sensors 130 and a sensor circuit 148 for measuring the pedaling force applied to the crank arm 116A. The bicycle crank assembly 112 can further include a storage device 132 and a processor 134 that are mounted on the crank arm 116A in the same manner as the bicycle crank assembly 12 described above. Preferably, the crank arm 116B has a similar configuration with a plurality of strain sensors (not shown) and a sensor circuit (not shown) for measuring the pedaling force applied to the crank arm 116B. A bicycle electric device 114 is further provided on the bicycle crank assembly 112. The bicycle electric device 114 includes the wireless communication device 40 and the battery 26 of the bicycle electric device 14. The crank arm 116A of the bicycle crank assembly 112 is identical to the crank arm 16A described above except that it has fewer electrical components mounted thereon, and will therefore not be discussed in detail herein.

In the illustrated embodiment, the method for determining the crank angle can occur as follows. As stated above, the strain sensors 130 are configured to detect the pedaling force or the pedaling torque applied to the bicycle crank assembly 112. Thus, in step S100, the processor 134 receives the pedaling torque applied to the bicycle crank assembly 112 from the strain sensors 130 to measure at least one of the pedaling force and the pedaling torque applied. Thus, the measuring of the pedaling force comprises detecting a signal from the strain sensor 130. The strain sensors 130 are configured to be mounted onto a bicycle component of the crank arm 116A.

Figure 14:
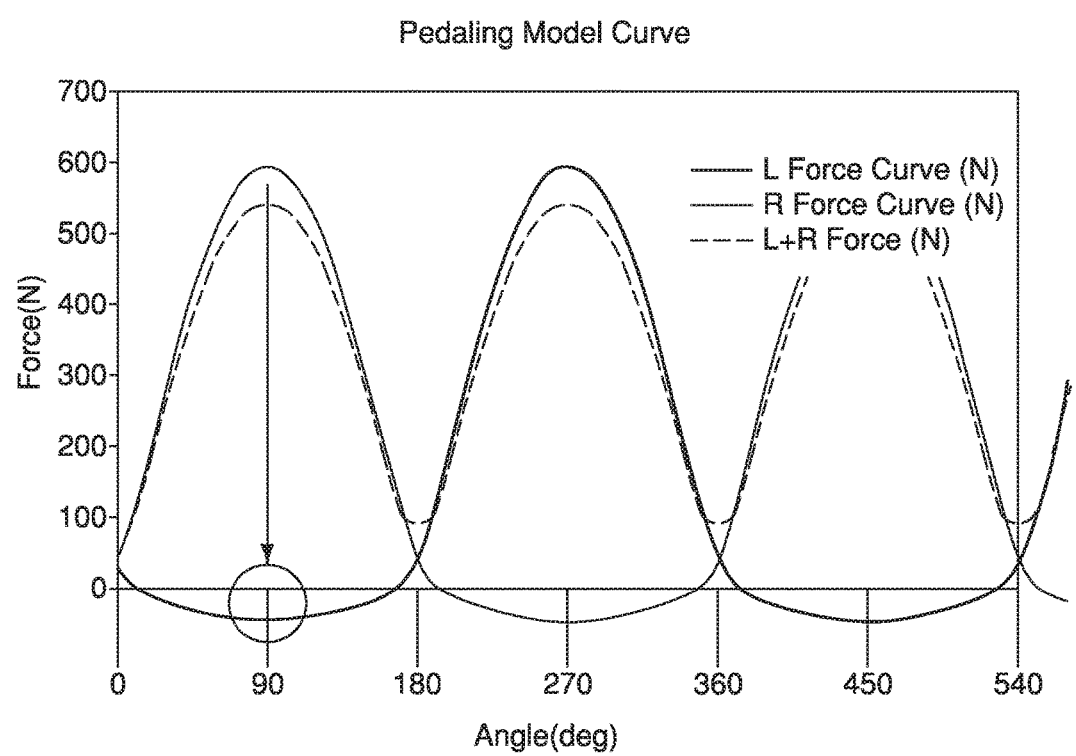
FIG. 14 is a pedaling model curve illustrating a relationship between pedaling torque and angular force for the left and right crank arms of the modified bicycle crank assembly of FIG. 13.

As stated, the crank arm 116A has the storage device 132. The storage device 132 has a pre-stored relationship relating to the pedaling torque or pedaling force and the angular force of the right and left crank arms 116A and 116B. For example, the pre-stored relationship is a pedaling model curve, as seen in FIG. 14.

In step S102, the processor 134 calculates the pedaling force based on the pedaling force signals. The processor 134 is configured to estimate the crank angle of the crank arm 116A based on the pre-stored relationship and the pedaling force. The pedaling force is preferably the tangential force Fθ. In step S103, the processor 134 calculates the crank angle by comparing the at least one of the pedaling force and the pedaling torque to the pre-stored relationship relating to the pedaling torque and the crank angle of the crank arm 116A. Specifically, the processor 134 compares the at least one of the pedaling force and the pedaling torque detected by the strain sensor 130 to the information of the pre-stored relationship. In the illustrated embodiment, the processor 134 is configured to be attached to the crank arm 116A. The processor 134 can utilize the methods taught by U.S. Pat. No. 5,027,303 to calculate the above. In this way, the angle of the crank arm 116A based on the at least one of the pedaling force and the pedaling torque is determined without an angle detector installed on the bicycle crank assembly 112.

In step S104, the processor 134 calculates the angular pedaling force based on information of the calculated crank angle, as described above. In step S105, the calculated angular force information is transmitted to the cycle computer CC for display.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle electric device. Accordingly, these directional terms, as utilized to describe the bicycle electric device should be interpreted relative to a bicycle in an upright riding position on a horizontal surface and that is equipped with the bicycle electric device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electric device provided to a bicycle crank assembly comprising:
   an indicator configured to generate a user signal indicating that a crank arm of the bicycle crank assembly is at a predetermined position with respect to a bicycle frame;
   at least one of a position sensor and a strain sensor configured to be provided on the bicycle crank assembly to detect information of the crank arm, the position sensor being configured to detect the predetermined position of the crank arm with respect to the bicycle frame, the predetermined position being a position in which the indicator is activated to begin generating the user signal; and
   a processor configured to process information detected by the at least one of the position sensor and the strain sensor to calculate angular force information of the crank arm that is at least one of a tangential force that is applied to the crank arm and a radial force that is applied to the crank arm.

2. The bicycle electric device according to claim 1, wherein
   the position sensor is configured to be provided on the crank arm.

3. The bicycle electric device according to claim 1, wherein
   a wireless communication device operatively coupled to the crank arm.

4. The bicycle electric device according to claim 1, wherein
   the position sensor includes a reed switch.

5. The bicycle electric device according to claim 1, wherein
   a magnet configured to be mounted on the bicycle frame.

6. The bicycle electric device according to claim 1, wherein
   the indicator is a light source.

7. The bicycle electric device according to claim 1, wherein
   the indicator is a sound source.

8. The bicycle electric device according to claim 1, wherein
   a mobile device including a processor for calculating a crank angle based on the predetermined angular position detected by the position sensor.

9. The bicycle electric device according to claim 8, wherein
   the mobile device has an inclinometer.

10. The bicycle electric device according to claim 9, wherein
    the inclinometer includes at least one of an accelerometer and a gyroscope.

11. The bicycle electric device according to claim 1, wherein
    a storage device operatively coupled to the crank arm.

12. The bicycle electric device according to claim 1, wherein
    the strain sensor is disposed on the crank arm and configured to detect a pedaling force applied to the crank arm.

13. The bicycle electric device according to claim 12, wherein
    the processor is configured to process the pedaling force detected by the at least one strain sensor to calculate angular force information.

14. The bicycle electric device according to claim 13, further comprising
    a cycle computer having a display configured to receive the angular force information calculated by the processor and configured to display the angular force information on the display as at least one of a tangential force applied to the crank arm and a radial force applied to the crank arm.

15. A method for determining a crank angle, the method comprising:
    reaching a predetermined angular position that is determined by a position sensor, the position sensor detecting the predetermined angular position of the crank arm with respect to the bicycle frame;
    measuring an angle of the crank arm using an external device while the crank arm is in a predetermined angular position,
    transmitting information with respect to the angle of the crank arm from the external device to a bicycle component having the crank arm and a storage device;
    rotating the crank arm which is mounted to a bicycle to the predetermined angular position; and
    receiving an indication indicating from an indicator that the crank arm is at the predetermined angular position, the predetermined angular position being a position in which the indicator generates the indication.

16. The method according to claim 15, wherein the indicating comprises lighting.

17. The method according to claim 15, wherein the indicator is disposed on the crank arm.

18. The method according to claim 15, wherein the measuring of the angle includes coupling the external device to the crank arm mechanically while the crank arm is at the predetermined angular position.

19. The method according to claim 15, wherein the measuring of the angle of the crank arm includes calculating the crank angle using a software application of the external device.

20. The method according to claim 15, wherein the position sensor is provided on the crank arm.

21. A method for determining an angle of a bicycle crank arm, the method comprising:
measuring at least one of a pedaling force and a pedaling torque applied to a bicycle crank assembly; and
comparing the at least one of the pedaling force and the pedaling torque to a pre-stored relationship relating to the pedaling torque and a crank angle of the bicycle crank arm to thereby determine an angle of the bicycle crank arm that is independent of a bicycle frame, the determining being based on the at least one of the pedaling force and the pedaling torque without an angle detector installed on the bicycle crank assembly.

22. The method according to claim 21, wherein the measuring further comprises detecting a signal from at least one strain sensor configured to be mounted onto a bicycle component of the bicycle crank arm.

23. The method according to claim 21, wherein the determining further comprises calculating the crank angle by comparing the at least one of the pedaling force and the pedaling torque detected by the strain sensor to the information of the pre-stored relationship.

* * * * *